United States Patent Office 2,806,829
Patented Sept. 17, 1957

2,806,829

SOLUTIONS OF POLYCAPROLACTAM IN DI-METHYL SULFOXIDE AND METHOD OF MAKING SAME

David B. Capps, Decatur, Ala., assignor to The Chemstrand Corporation, Decatur, Ala., a corporation of Delaware No Drawing. Application April 25, 1955,
Serial No. 503,825

4 Claims. (Cl. 260—30.8)

This invention relates to compositions of matter, and more particularly, to new and useful compositions of matter comprising solutions of polycaprolactam.

It is well-known that polymerized epsilon-caprolactam, or polycaprolactam, is capable of being fabricated into many useful objects, including high-strength fibers and extrusion moldings. The conventional technique for preparing polycaprolactam fibers and moldings involves spinning, extruding, or otherwise forming the objects from the molten polymer. There are, however, many advantages to the use of solutions to achieve fluid dopes rather than melt extrusion. The application of lacquers and coatings and the formation of films and sheets from solutions are more easily carried out by known methods than the same operation with molten polymer. The incorporation of plasticizers or other modifying agents in the polymers may be more easily accomplished by additions to solutions thus avoiding the problems of discoloration and decomposition frequently encountered when blending is done in the melt. Films and coatings of uniform thickness are much easier to obtain from solutions than from the higher viscosity molten compositions. Recovery of waste and scrap material from the manufacture, shaping, and fabrication of polycaprolactam shapes is rendered feasible by the use of solutions. Thus, waste and scrap materials can be employed which contain contaminants or impurities such as dirt, oil, floor sweepings, delusterants, etc., rather than the absolutely clean materials required for remelting.

Known solvents for polycaprolactam possess several disadvantages. The most important of those disadvantages so far as their use in wet-spinning operations are concerned is the fact that most known solvents will dissolve polycaprolactam in useful concentrations only at or near the boil. At such high temperatures degradation and discoloration of the polycaprolactam are constant problems. Furthermore, these high temperatures required for solvation of polycaprolactam and maintenance of homogeneity of the solutions make it impractical to spin such solutions into most known coagulating baths. Consequently, a wet-spinning process for polycaprolactam has not been considered commercially feasible.

The primary object of this invention is the provision of new and useful compositions of matter comprising polycaprolactam solutions which are useful in making fibers, filaments, bristles, ribbons, coatings, and the like. A further purpose of the invention is to provide compositions of matter comprising polycaprolactam solutions which may be wet-spun. A still further purpose is to provide a new low-cost solvent for the preparation of polycaprolactam fibers. Other objects of the invention will become apparent from the description hereinafter.

It has now been found that these and other objects of the invention can be accomplished by dissolving polycaprolactam in dimethylsulfoxide. The temperature to which it is necessary to heat a mixture of polycaprolactam and dimethylsulfoxide in order to effect solution will depend upon the degree of polymerization of the polycaprolactam. In general, homogenous solutions will result from heating to a temperature between about 125° and 165° C. In the usual practice of this invention a temperature of from about 130° to 150° C. is preferred.

This invention is applicable to polymers consisting of polymerized epsilon-caprolactam. The polymers may be the result of polymerizing the monomeric epsilon-caprolactam, epsilon-aminocaproic acid, or any of the other well-known amide-forming derivatives of epsilon-aminocaproic acid, such as the esters, acid halides, and amides.

The higher molecular weight caprolactam polymers (those having an intrinsic viscosity above 0.4) possess the inherent capability of being formed into filaments which can be cold drawn into fibers showing orientation along the fiber axis. These high molecular weight caprolactam polymers, though generally somewhat less soluble than the lower molecular weight polymers are more useful for most purposes, since they excel in toughness and durability. Intrinsic viscosity of polycaprolactam may be determined from the formula $$\frac{\log_e \eta r}{C}$$

in which $\eta r$ is the viscosity of a 0.5 percent solution in meta-cresol at 25° C. divided by the viscosity of a meta-cresol solvent at the same temperature and C is the concentration of the polymer in grams per 100 cc. of solution.

The following examples, in which parts, proportions, and percentages are by weight, illustrate further the application of the principles of the invention.

*Examples I*

To one part of polycaprolactam there was added four parts of dimethylsulfoxide and the mixture heated on an oil bath to 135° C. At this temperature the polycaprolactam was completely dissolved and the solution became clear, homogenous, and very viscous. This solution was suitable for extrusion into a non-solvent coagulating bath to yield filaments or for casting to form films.

*Example II*

To one part of polycaprolactam there was added two parts of dimethylsulfoxide and the mixture heated on an oil bath to 140° C. At this temperature the polycaprolactam was completely dissolved and the solution became clear, homogenous, and very viscous. This solution was suitable for extruding into a non-solvent coagulating bath to form filaments and for casting to form films, as was demonstrated by dipping a glass rod into the solution and washing in water to leave a tough film on the rod.

Although specific reference has been made to the use of solutions for the formation of filaments and films, the invention is not limited thereto, since the solutions are useful for forming a variety of objects irrespective of the shape of the object. Typical objects which can be formed from the solutions are bristles, ribbons, sheets, and plasticized or otherwise modified solid compositions useful for making molded articles. The solutions are also useful for application as lacquers on wood, metal, glass, and other surfaces, for coating wire, fabrics, regenerated cellulose, and the like and for impregnating fabric and other porous material.

The properties of the objects formed from the compositions herein described may be modified by appropriate modification of the composition. Thus, the compositions of this invention may have incorporated therein various modifying agents such as plasticizers, dyes, pigments, diluents, resins, cellulose derivatives, waxes, water repellents, luster modifying agents, flame repellents, and the like. Solutions of polycaprolactam can be solution blended with solutions of other synthetic linear condensation polymers, such as polyamides derived from diamine and dicarboxylic acids, polyesters, polyurethanes, and the like, in the same or compatible solvents.

Fibers and filaments can be prepared from the compositions of this invention by either dry-spinning or wet-spinning into suitable coagulating baths. Filaments obtained by these methods have a more porous surface than those obtained by melt spinning. Staple fibers cut from these filaments can be more readily spun into yarns and the yarns possess a loftier and more desirable "hand," or touch, than staple fibers made from melt spun filaments.

As many widely different embodiments of this invention may be made without departing from the spirit and scope thereof, it is to be understood that the invention is not limited to the specific embodiments thereof except as defined in the appended claims.

I claim:

1. A composition of matter comprising a solution of polycaprolactam in dimethylsulfoxide.

2. A process for preparing a fiber-forming solution comprising mixing polycaprolactam with dimethylsulfoxide and heating said mixture until the said polycaprolactam is substantially dissolved in the dimethylsulfoxide.

3. A process for preparing a fiber-forming solution comprising mixing polycaprolactam with dimethylsulfoxide and heating said mixture to a temperature of from about 125° to about 165° C. until the polycaprolactam in substantially dissolved.

4. A process for preparing a fiber-forming solution comprising dissolving polycaprolactam in dimethylsulfoxide heated to from about 125° to about 165° C.

References Cited in the file of this patent

UNITED STATES PATENTS 2,404,717     Houtz                 July 23, 1946